J. R. TORREY.

COMBINED RAZOR STROP AND TOILET CASE.

No. 10,229. Reissued Oct. 31, 1882.

Witnesses;

Albert A. Parker.

Walter B. Nourse.

Inventor;

Joseph R. Torrey

UNITED STATES PATENT OFFICE.

JOSEPH R. TORREY, OF WORCESTER, MASSACHUSETTS.

COMBINED RAZOR-STROP AND TOILET-CASE.

SPECIFICATION forming part of Reissued Letters Patent No. 10,229, dated October 31, 1882.

Original No. 240,055, dated April 12, 1881. Application for reissue filed July 29, 1882.

*To all whom it may concern:*

Be it known that I, JOSEPH R. TORREY, of the city and county of Worcester, and Commonwealth of Massachusetts, have invented certain new and useful Improvements in Combined Razor-Strop and Toilet-Case; and I do hereby declare that the following is a full, clear, and exact description of the same, reference being had to the accompanying drawings, forming a part of this specification, and in which—

Figure 1:
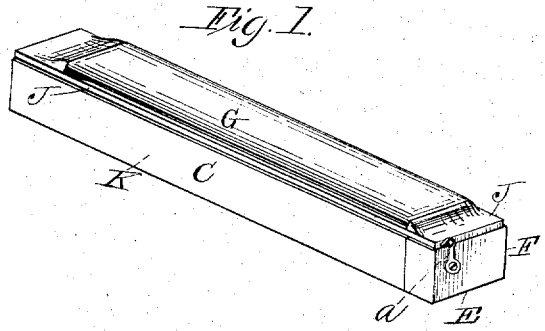
Figure 2:
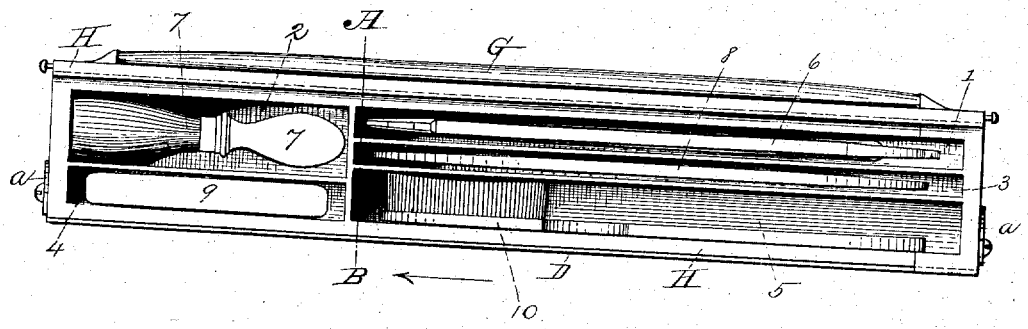
Figure 3:
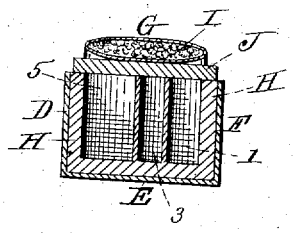

Figure 1 represents a perspective view. Fig. 2 represents, upon an enlarged scale, the parts shown in Fig. 1, with the cover or top turned back to represent the toilet-case; and Fig. 3 represents a section on line A B, Fig. 2, with the hinged top or cover in position, as represented in Fig. 1.

To enable those skilled in the art to which my invention belongs to make and use the same, I will proceed to describe it more in detail.

In the drawings, the part marked C represents the device when closed for use as a razor-strop. The surfaces D, E, F, and G are stropping-surfaces, the latter being an elastic one, the others being finished on wooden bases H H H. The stropping-surface G rests upon cushion I, and the whole upon the hinged cover J, which is held to the lower part, K, by hooks *a*, as indicated in Figs. 1 and 2 of the drawings. The case part K is divided into five divisions, 1, 2, 3, 4, and 5, for receiving the razor 6. brush 7, comb 8, soap 9, and tooth-brush 10.

It will be observed that the hinged top J is narrower than the lower part, D E F, and will not strike the razor.

This combined razor-strop and toilet-case may be run into a covering-case, if preferred.

It will thus be seen that the part C, while serving as a four-sided razor-strop, is made to subserve the additional function and purpose of a toilet-case, thereby enabling the traveler to carry the same and the articles contained therein in a very convenient and perfect manner.

If preferred, a different stropping-surface may be substituted for the cushioned stropping-surface G.

Those skilled in the art to which my invention belongs will appreciate the real novelty and practical value which it presents, and that it supplies a want which has long been felt, especially by the traveling public.

What I claim as my invention, and desire to secure by Letters Patent, as an improved article of manufacture, is—

1. A combined razor-strop and toilet-case, consisting of a case, K, provided with divisions 1, 2, 3, 4, and 5 for receiving the razor, brush, comb, soap, and toilet-brush, and also provided with hinged top J, and stropping-surfaces, all substantially as shown and described.

2. A combined razor-strop and toilet-case, consisting of a case having suitable compartments for receiving toilet articles, and provided with a hinged cover and exterior stropping-surfaces, substantially as shown and described.

JOSEPH R. TORREY.

Witnesses:
ALBERT A. BARKER,
CHARLES L. REDDING.